United States Patent [19]

Kawaguchi et al.

[11] Patent Number: 4,850,683
[45] Date of Patent: Jul. 25, 1989

[54] LIQUID CRYSTAL DISPLAY ELEMENT AND PROCESS FOR PRODUCING THE SAME

[75] Inventors: Hideo Kawaguchi; Takashi Takayanagi, both of Shizuoka, Japan

[73] Assignee: Fuji Photo Film Co., Ltd., Kanagawa, Japan

[21] Appl. No.: 130,129

[22] Filed: Dec. 8, 1987

[30] Foreign Application Priority Data

Dec. 8, 1986 [JP] Japan .................................. 61-292017

[51] Int. Cl.$^4$ .......................... G02F 1/13; C09K 19/00
[52] U.S. Cl. ............................ 350/350 R; 252/299.01; 350/334; 350/347 R; 350/350 S; 350/351; 428/1
[58] Field of Search .................. 252/299.01, 299.7; 350/350 S, 350 R, 351, 334, 347 R; 428/1

[56] References Cited

U.S. PATENT DOCUMENTS

| | | | |
|---|---|---|---|
| 3,620,889 | 11/1971 | Baltzer | 252/299.7 |
| 3,969,264 | 7/1976 | Davis | 252/299.7 |
| 4,022,706 | 5/1977 | Davis | 252/299.7 |
| 4,048,358 | 9/1977 | Shanks | 252/299.7 |
| 4,161,557 | 7/1979 | Suzuki et al. | 252/299.7 |
| 4,601,863 | 7/1986 | Shioi et al. | 252/299.7 |
| 4,664,480 | 5/1987 | Geary et al. | 350/350 S |
| 4,671,618 | 6/1987 | Wu et al. | 350/350 R |
| 4,673,255 | 6/1987 | West et al. | 350/350 R |
| 4,685,771 | 8/1987 | West et al. | 350/350 R |
| 4,702,558 | 10/1987 | Coles et al. | 252/299.01 |
| 4,707,080 | 11/1987 | Fergason | 252/299.01 |

FOREIGN PATENT DOCUMENTS

| | | | |
|---|---|---|---|
| 133004 | 11/1988 | German Democratic Rep. | 252/299.7 |
| 54-37073 | 3/1979 | Japan | 252/299.7 |
| 54-126558 | 10/1979 | Japan | 252/299.01 |
| 54-6883 | 11/1979 | Japan | 252/299.7 |
| 63-43993 | 2/1988 | Japan | 252/299.01 |

*Primary Examiner*—Teddy S. Gron
*Attorney, Agent, or Firm*—Sughrue, Mion, Zinn, Macpeak & Seas

[57] ABSTRACT

A liquid crystal display element and a process for producing the same is disclosed. The liquid crystal display is composed of liquid crystals filled in a matrix comprising at least two high polymers having neither mutual compatibility nor substantial compatibility with the liquid crystals, said matrix being sandwiched between two transparent electrode bases. The display element is produced by applying a solution of the liquid crystals and the aforesaid high polymers in a common solvent onto a transparent electrode base, drying the solution to cause phase separation, and laminating another transparent electrode base on the dry film. The display element provides a wide display area with bright contrast and achieves orientation of liquid crystals with a low applied voltage.

5 Claims, No Drawings

LIQUID CRYSTAL DISPLAY ELEMENT AND PROCESS FOR PRODUCING THE SAME

FIELD OF THE INVENTION

This invention relates to a liquid crystal display material responsive to an electric field or heat, and more particularly to a display element comprising liquid crystals filled in high polymeric matrix and a process for producing the same.

BACKGROUND OF THE INVENTION

A liquid crystal display mode using an element comprising liquid crystals supported between transparent electrode bases is now widely employed in various display elements, such as electronic calculators and watches. However, this display mode provides a dark view of the display because of the use of two polarizing films and also finds difficulty in broadening a display area because of the structure composed of two glass plates with liquid crystals sandwiched therebetween.

H. G. Craighead reports in *Appl. Phys. Letter,* Vol. 40, p. 22 (1982) that an element comprising liquid crystals filled in micro pores of a millipore filter is opaque with no electrical voltage being applied but becomes transparent upon application of a voltage. According to this display mode, the display area can be widened easily, but the orientation of the liquid crystals requires application of a high voltage of from 150 V to 500 V, since the element has a thickness of 130 $\mu$m arising from the millipore filter.

SUMMARY OF THE INVENTION

One object of this invention is to provide a display element which provides a wider display area with a bright contrast and achieves orientation of the liquid crystals with a low applied voltage.

Another object of this invention is to provide a process for producing such a display element.

The objects of this invention can be accomplished by a display element comprising liquid crystals filled in a matrix comprising at least two high polymers having neither mutual compatibility nor compatibility with the liquid crystals, said matrix being sandwiched between transparent electrode bases.

The display element of the present invention can be produced by dissolving liquid crystals and at least two high polymers having neither mutual compatibility nor compatibility with the liquid crystals, in a common solvent, applying the solution on a transparent electrode base to form a film, drying the film to cause phase separation to obtain a film having the liquid crystals, filled therein, and laminating another transparent electrode base on the film.

According to the above-described process, the two or more high polymers undergo phase separation to form voids in which liquid crystals are filled. The thus obtained film containing the liquid crystals acts as a display material which responds to an electrical field or heat. That is, when using nematic liquid crystals, the element is opaque with no voltage applied and becomes transparent upon application of a voltage, thus achieving display through changes between non-transparency in the absence of voltage and transparency in the presence of a voltage.

On the other hand, when using smectic liquid crystals, the liquid crystals filled in the matrix are oriented by applying an electrical voltage to the entire area to become transparent, and the element remains transparent even on release of the applied voltage. When heat is then added to the transparent element, the areas heated become turbid white, and therefore opaque, thus achieving a writing display using heat.

DETAILED DESCRIPTION OF THE INVENTION

The two or more high polymers which can be used as the matrix in the display element should be selected so as to be incompatible with each other and also substantially incompatible with the liquid crystals to be combined. Examples of usable high polymers include cellulose derivatives, e.g., cellulose acetate, cellulose acetate propionate, cellulose acetate butyrate, nitrocellulose, ethyl cellulose, methyl cellulose, etc; high polymeric condensation products, e.g., soluble polyester, polycarbonate, soluble nylon, etc.; and homo- or copolymers of vinyl chloride, vinylidene chloride, vinyl acetate, vinyl formal, vinyl butyral, alkyl acrylates having form 1 to 4 carbon atoms in the alkyl moiety thereof, alkyl methacrylates having from 1 to 4 carbon atoms in the alkyl moiety thereof, styrene, hydroxystyrene, etc.

The liquid crystals which can be used in the present invention include those showing positive dielectric anisotropism, such as nematic liquid crystals, smectic liquid crystals, and the like. Specific examples of these liquid crystals are ZLI-1780, ZLI-1840, ZLI-1844, ZLI-2143, and ZLI-2448 (trade names of nematic liquid crystals produced by Merck Co.) and $S_1$, $S_2$, $S_3$, $S_4$, and $S_5$ (trade names of smectic liquid crystals produced by BHD Co.).

The above-described two or more high polymers and liquid crystals are dissolved in a solvent capable of dissolving all of these components to form a uniform solution, and the solution is applied onto a transparent electrode base and dried to form a film. The film is in a homogeneous state while a sufficient amount of the solvent is present. As the solvent evaporates, phase separation occurs among the high polymers and also between the high polymers and the liquid crystals, thereby becoming turbid white. When the solvent is substantially removed, a film is obtained comprising a high polymeric matrix having the liquid crystals dispersed therein.

The solvent to be used is not particularly limited as long as it is capable of dissolving both the liquid crystals and the high polymers and, though varying depending on the high polymers used, may be selected from, for example, halogenated hydrocarbons, e.g., methylene dichloride, chloroform, ethylene dichloride, trichloroethylene, etc.; alcohols, e.g., methanol, ethanol, propanol, isopropanol, etc.; esters, e.g., methyl acetate, ethyl acetate, propyl acetate, etc.; aromatic hydrocarbons, e.g., benzene, toluene, etc.; ethers, e.g., tetrahydrofuran, dioxane, etc., ketones, e.g., acetone, methyl ethyl ketone, methyl isobutyl ketone, etc.; and the like. These solvents may be used either individually or in combinations thereof.

The mixed solution of the liquid crystals and high polymers is then applied to a transparent electrode by coating, or the like technique and dried. Coating can be effected by, for example, blade coating, bar coating, spin coating, screen printing, etc. The coating film preferably has a dry thickness of from 2 to 30 $\mu$m, and more preferably from 3 to 20 $\mu$m. Then, another transparent electrode is laminated on the film by thinly applying an adhesive thereon.

The total high polymers are preferably used in a concentration of from 3 to 20% by weight based on the solvents. The ratio of the liquid crystals to the total high polymers in the solution preferably ranges from 1:1 to 1:0.25 by weight. If desired, the solution may further contain additives, such as dyes and surface active agents.

The transparent electrode base on which the mixed solution is applied may be any of general transparent electrode bases composed of a glass plate or a plastic sheet made of polyethylene terephthalate, polycarbonate, polysulfone, cellulose triacetate, polymethyl methylacrylate, etc. on which a metal oxide is deposited by vacuum evaporation, sputtering or the like technique to form a transparent conductive layer.

The present invention is now illustrated in greater detail with reference to Examples, but it should be understood that the present invention is not deemed to be limited thereto. In these examples, all the parts are by weight unless otherwise indicated.

EXAMPLE 1

Onto a transparent electrode base composed on a 120 μm thick polyethylene terephthalate film (30 cm width and 50 cm length) having provided thereon a transparent conductive layer of an indium-tin oxide (surface resistivity: 300Ω) was coated a solution having the following formulation by the use of an applicator to a dry film thickness of 8 μm.

| Solution Formulation: | |
| --- | --- |
| Soluble polyester (trade name "Vylon 200" produced by Toyo Spinning Co., Ltd.) | 10.0 parts |
| Cellulose acetate butyrate (product of Eastman Chemical Co., Ltd.) | 10.0 parts |
| Methylene dichloride | 230.0 parts |
| Liquid crystal (trade name "ZLI-1844" produced by Merck Co.) | 50.0 parts |

After coating, the coated film was dried at 25° C. for 3 minutes and then at 55° C. for 5 minutes. The same electrode base as used above was adhered to the dried film using Binsol R-50 (manufactured by Ipposha Col., Ltd.) as an adhesive.

The resulting display element had a transmittance of 4.5%, which increased to 70% when a voltage of 50 V was applied to the upper and lower electrodes, presenting a satisfactory contrast relative to the original non-transparency.

EXAMPLE 2

On a transparent electrode base composed of a 100 μm thick polyethylene terephthalate film having provided thereon the same transparent conductive layer as used in Example 1 was dip-coated a solution having the following formulation to a dry film thickness of 10 μm.

| Solution Formulation: | |
| --- | --- |
| Polyvinyl formal (product of Sekisui Chemical Co., Ltd.) | 10 parts |
| Diacetyl cellulose (product of Daisel Ltd.) | 10 parts |
| Methylene dichloride | 170 parts |
| Acetone | 80 parts |
| Liquid crystal (trade name "E-63" produced by BDH Co.) | 45 parts |

The coated film was dried at 25° C. for 3 minutes and then at 65° C. for 10 minutes. After drying, the same transparent electrode base as used above was adhered on the dried film.

The resulting display element was found to have a transmittance of 50%, which increased to 72% with a voltage of 60 V being applied to the upper and lower electrodes, causing a sufficient contrast to the original non-transparency to make the display element suitable for use as a display material responsive to an electrical field.

EXAMPLE 3

A solution having the following formulation was coated on the same transparent electrode base as used in Example 2 to a dry thickness of 7 μm in accordance with a screen printing method.

| Solution Formulation: | |
| --- | --- |
| Vylon 200 | 15 parts |
| Polyvinyl formal (product of Sekisui Chemical Co., Ltd.) | 5 parts |
| Methylene dichloride | 120 parts |
| Liquid crystal (trade name "S$_2$" produced by BDH Co.) | 55 parts |

The coated film was dried at 25° C. for 3 minutes and then at 55° C. for 5 minutes, and the same transparent electrode base as used above was then laminated thereon.

The resulting display element became transparent on application of a voltage of 80 V to the upper and lower electrodes, and such a transparent state was held even after release of the applied voltage. When the transparent element was then locally heated to 60° C., followed by quenching, only the heated area became opaque, establishing the possibility that one may write on the display using heat.

While the invention has been described in detail with reference to specific embodiments thereof, it will be apparent to one skilled in the art that various changes and modifications can be made therein without departing from the spirit and scope thereof.

What is claimed is:

1. A process for producing a liquid crystal display element, which comprises
   dissolving liquid crystals and at least two mutually incompatible high polymers, each polymer being substantially incompatible with the liquid crystals, in a solvent capable of dissolving both the liquid crystals and the high polymers to form a uniform solution,
   applying the solution onto a transparent electrode base, followed by drying to form a film, and
   laminating another transparent electrode base on the film.

2. A process as claimed in claim 1, wherein said liquid crystals are nematic liquid crystals or smectic liquid crystals.

3. A process as claimed in claim 1, wherein the weight ratio of the liquid crystals to the total high polymers in the solution is in the ranges of from 1:1 to 1:0.25.

4. A process as claimed in claim 1, wherein said solution is applied to a dry thickness of from 2 to 30 μm.

5. A process as claimed in claim 1, wherein said solution is applied to a dry thickness of from 3 to 20 μm.

* * * * *